May 28, 1929.  T. S. MEEKINS  1,715,094
CONVEYER CHAIN
Filed April 26, 1927
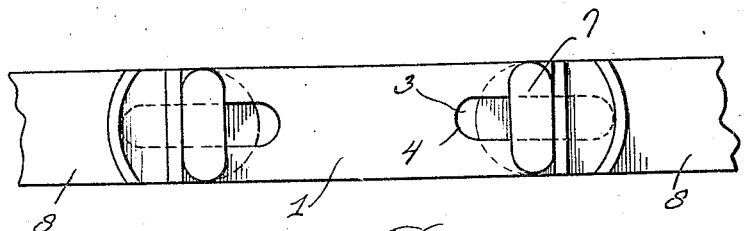
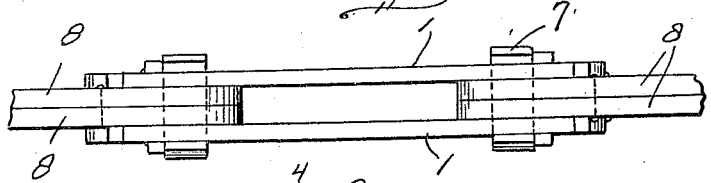
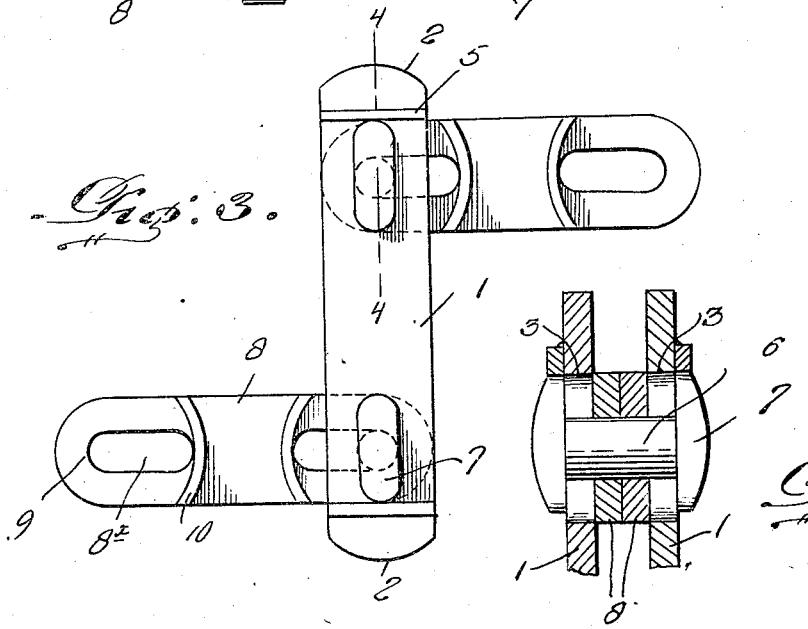
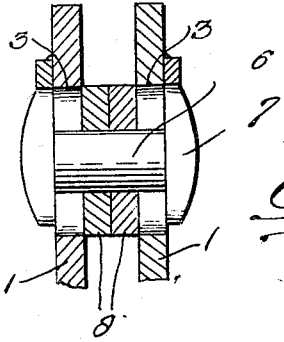
Inventor
T. S. Meekins,
By Clarence A. O'Brien
Attorney Patented May 28, 1929.

1,715,094

UNITED STATES PATENT OFFICE.

THOMAS S. MEEKINS, OF WHITE HAVEN, PENNSYLVANIA.

CONVEYER CHAIN.

Application filed April 26, 1927. Serial No. 186,758.

The object of my said invention is the provision of a positive locking, non-buckling and rivetless conveyer chain embodying a certain specific construction so characterized that the chain is susceptible of inexpensive and expeditious production and yet is generally well adapted to withstand the usage to which conveyer chains are ordinarily subjected.

To the attainment of the foregoing, the invention consists in the improvement as hereinafter described and definitely claimed.

In the accompanying drawing forming part of this specification:

Figure 1 is a side elevation illustrating the portion of a conveyer chain constructed in accordance with my invention.

Figure 2 is a top plan view of the same.

Figure 3 is a side elevation illustrative of the mode of unlocking when it is desired to remove one or more link members.

Figure 4 is an enlarged detail section taken on the plane indicated by the line 4—4 of Figure 3.

Similar numerals of reference designate corresponding parts in all the views of the drawing.

The outer links of my novel conveyer chain are designated by 1, and each is provided with arcuate ends 2, with longitudinal central slots 3 characterized by rounded ends 4, and with exterior abutments 5 at the outer ends of the slots 3 and at right angles to the longitudinal median line of the links.

The chain also comprises inner links, and locking pins, each of the said locking pins having a shank 6 of circular cross section and also having T-heads 7. The inner links are each formed by two side by side members each of which members is of the same thickness and width as the links 1. Said members of the inner links are numbered 8, and in the members 8 of each inner link are formed longitudinal registering slots $8^x$ having rounded ends 9; and it will also be understood that each of the said members 8 of each inner link is provided at its outer side with lateral arcuate abutments 10, said abutments 10 having their intermediate portions immediately adjacent to the inner ends of the longitudinal slots 8.

Manifestly when the outer links 1, the inner links formed by the side by side members 8 and the locking pins are relatively arranged as shown in Figures 1 and 2, the heads of the locking pin rest against the abutments 5 of the outer links 1 and turning of the locking bolts about their axes is precluded, while the arcuate ends of the outer links 1 bear against the arcuate abutments 10 of the members 8 with the result that casual endwise movement of the outer links 1 with respect to the members 8 of the inner links is precluded, and a strong positively locked, non-buckling and rivetless conveyer chain is produced.

In Figure 3 is shown the mode of assembling the parts of the chain, and by reference to said figure it will be understood that in order to assemble the parts, the locking pins are are placed in the slots of the inner link members 8 with the heads of the locking pins at right angles to the slots $8^x$ in said inner link members 8. In the positions of the inner link members as shown in Figure 3, outer links can be disposed or moved over the pin head, after which the locking pins may be turned about their axes to put their heads in parallelism with the abutments 5 of the outer links 1 after which the outer links can be swung into alinement with the inner link members. From this it follows that when occasion demands, any one or more outer links or inner link members 8 may be incorporated in or removed from the chain.

A highly important feature of my invention resides in the fact that the outer links 1 and the side by side members 8 of each inner link are of a common thickness and width. From this it follows that all of the outer links 1 and inner link members 8 may be cut from a common bar.

Another important feature of my invention resides in the fact that the straight abutment 5 of the outer links 1, and the arcuate abutments 10 of the inner link members 8 are of the same size in cross section. From this latter it follows that all the abutments 5 and 10 incorporated in my novel chain may be cut from a common bar of straight character, the arcuate members 10 being reduced to arcuate form subsequently to the cutting of the proper length for the abutments 10 from the bar alluded to. I would also have it understood that spot welding will suffice for and is preferably employed in the fixing of the abutments 5 and 10 to the outer links 1 and the inner link members 8, respectively, this because in the use of the chain the said abutments are subjected to but little stress. This latter will be better understood when attention is directed to the fact that the pull on the outer links 1 is placed on the shank 6 of the locking bolt, and that the said shanks bear against the outer ends of the bolts 9 in the inner link members 8, or conversely pull on the inner link members is imposed directly on the shanks of the locking bolts and is placed by the said shanks against the outer ends of the slots 3 in the outer links 1.

It will further be noted that my invention is characterized by simplicity of manufacture, which is a complete departure from that used in the manufacturing of any other rivetless conveyer chain, and that it produces a chain carrying all of the wearing qualities and strength of chains made with the expensive drop-forge process, at a considerably reduced cost. Chains made under my invention will be stamped from cold bar steel of a common thickness and spot welding will suffice for, and is preferably employed, in the fixing of the abutments 5 and 10 to the outer link 1, and the inner link members 8 respectively.

Furthermore, this mode of manufacture can be used in the manufacturing of conveyer chains of acid-resisting metals such as rolled phosphorus bronze, the links of the chain being stamped from the material in the same manner as from bar steel. Under present designs, rivetless conveyer chains can only be made from such acid-resisting metals by casting, which does not have the strength or endurance usually called for in conveyer chains.

I have specifically described the preferred embodiment of my invention in order to impart a full, clear and exact understanding of all features of the same. I do not desire, however, to be understood as limiting myself to the precise structure disclosed, my invention being defined by my appended claims within the scope of which modifications may be made without departure from my invention.

Having thus described the invention, what I claim is:—

1. In a conveyer chain and in combination, inner links, each comprising side by side members having coincident longitudinal slots and also having at their outer sides lateral arcuate abutments immediately adjacent the inner end of said slots, outer links with arcuate ends and having longitudinal slots and also having at their outer sides and at the outer ends of said slots abutments at right angles to the length of the links and locking pins having shanks arranged in the said slots of the inner link members and the outer links and also having heads at the ends of the shanks and at the outer sides of the outer links and adapted to rest normally in parallelism with the abutments of the outer links while the ends of said outer links rest in the arcuate abutments of the inner link members; the outer links and the members of the inner links being of a common width and thickness, and the abutments of the outer links and the abutments of the inner link members being of a common size in cross section, and the said abutments being fixed to their respective links and link members.

2. A conveyer chain comprising outer links having arcuate ends and also having longitudinal slots with arcuate ends, and straight abutments at their outer sides immediately adjacent to the outer ends of the slots and at right angles to the length of the links, inner links having longitudinal slots with arcuate ends and also having at their sides and immediately adjacent to the inner ends of said slots arcuate abutments extending throughout the width of the links, locking bolts having shanks of circular cross section disposed in the slots of the links and also having at the ends of said shanks T-heads, the ends of which are arcuate; said T-heads adapted to cooperate with the straight abutments of the outer links substantially as and for the purpose set forth.

In testimony whereof I affix my signature.

THOMAS S. MEEKINS.